(12) United States Patent
Zhou

(10) Patent No.: US 10,067,910 B2
(45) Date of Patent: *Sep. 4, 2018

(54) SYSTEM AND METHOD FOR GPU MAXIMUM REGISTER COUNT OPTIMIZATION APPLIED TO GENERAL MATRIX-MATRIX MULTIPLICATION

(71) Applicant: Palo Alto Research Center Incorporated, Palo Alto, CA (US)

(72) Inventor: Rong Zhou, San Jose, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/201,123

(22) Filed: Jul. 1, 2016

(65) Prior Publication Data

US 2018/0004709 A1      Jan. 4, 2018

(51) Int. Cl.
*G06F 17/16* (2006.01)
*G06F 8/41* (2018.01)

(52) U.S. Cl.
CPC .............. *G06F 17/16* (2013.01); *G06F 8/443* (2013.01)

(58) Field of Classification Search
None
See application file for complete search history.

(56) References Cited

U.S. PATENT DOCUMENTS

| | | | | |
|---|---|---|---|---|
| 8,752,036 B2* | 6/2014 | Kalogeropulos | ..... | G06F 8/4452 717/149 |
| 2006/0265445 A1* | 11/2006 | Gustavson | .............. | G06F 17/16 708/520 |
| 2013/0111453 A1* | 5/2013 | Kalogeropulos | ..... | G06F 8/4452 717/161 |
| 2015/0324441 A1* | 11/2015 | Zhou | .......................... | G06T 1/20 707/737 |
| 2015/0324707 A1* | 11/2015 | Zhou | ................... | G06F 11/3409 717/124 |
| 2016/0179750 A1* | 6/2016 | Zhou | ........................ | G06F 17/16 708/203 |
| 2016/0299874 A1* | 10/2016 | Liao | ........................ | G06F 17/16 |
| 2017/0032487 A1* | 2/2017 | Ashari | ...................... | G06T 1/20 |
| 2017/0168990 A1* | 6/2017 | Kernert | ................... | G06F 17/16 |

* cited by examiner

*Primary Examiner* — David H Malzahn
(74) *Attorney, Agent, or Firm* — Shun Yao; Park, Vaughan, Fleming & Dowler LLP

(57) ABSTRACT

A method and system performing a general matrix-matrix multiplication (GEMM) operation using a kernel compiled with optimal maximum register count (MRC). During operation, the system may generate the kernel compiled with optimal MRC. This may involve determining a fastest compiled kernel among a set of compiled kernels by comparing the speeds of the compiled kernels. Each kernel may be compiled with a different MRC value between zero and a predetermined maximum number of registers per thread. The fastest compiled kernel is determined to be the kernel with optimal MRC. The system may receive data representing at least two matrices. The system may select the kernel compiled with optimal MRC, and perform the GEMM operation on the two matrices using the selected kernel. Some embodiments may also perform general matrix-vector multiplication (GEMV), sparse matrix-vector multiplication (SpMV), or k-means clustering operations using kernels compiled with optimal MRC.

20 Claims, 10 Drawing Sheets

TABLE 1

| b | 2×2 | 3×3 | 4×4 | 5×5 | 6×6 | 7×7 | 8×8 | 9×9 | 10×10 | 11×11 | 12×12 |
|---|-----|-----|-----|-----|-----|-----|-----|-----|-------|-------|-------|
| 8 | 585 | 662 | 872 | 813 | 941 | 711 | 265 | 84 | 57.3 | 44.8 | 40.2 |
| 12 | 570 | 713 | 835 | 831 | 889 | 744 | 244 | 90 | 52.7 | 44.6 | 39.8 |
| 16 | 613 | 774 | 898 | 894 | 950 | 821 | 277 | 75 | 53.3 | 45.0 | 25.9 |
| 20 | 557 | 728 | 830 | 839 | 902 | 805 | 258 | 74 | 42.8 | 30.3 | 25.9 |
| 24 | 577 | 752 | 851 | 867 | 922 | 858 | 206 | 73 | 42.1 | 29.9 | 25.9 |
| 32 | 601 | 768 | 838 | 920 | 644 | 689 | 166 | 77 | 39.7 | 29.7 | 24.5 |

Performance of GEMM kernels in GFLOPS
for $M = N = K = 4096$ on GTX 580

FIG. 3

TABLE 2

| b | 2×2 | 3×3 | 4×4 | 5×5 | 6×6 | 7×7 | 8×8 | 9×9 | 10×10 | 11×11 | 12×12 |
|---|-----|-----|-----|-----|-----|-----|-----|-----|-------|-------|-------|
| 8 | 440 | 670 | 854 | 960 | 1093 | 984 | 1189 | 773 | 887 | 854 | 960 |
| 12 | 445 | 623 | 789 | 999 | 1104 | 958 | 1117 | 776 | 836 | 864 | 848 |
| 16 | 474 | 654 | 807 | 984 | 1191 | 1139 | 841 | 892 | 945 | 940 | 856 |
| 20 | 426 | 629 | 747 | 915 | 892 | 1022 | 1097 | 801 | 854 | 936 | 686 |
| 24 | 436 | 623 | 696 | 932 | 929 | 1079 | 741 | 864 | 830 | 725 | 507 |
| 32 | 444 | 619 | 674 | 903 | 723 | 819 | 836 | 938 | 549 | 555 | 451 |

Performance of GEMM kernels in GFLOPS
for $M = N = K = 4096$ on K20c

FIG. 4

```
maxregs ← sysinfo.maxRegsPerThread    /* maxregs: max number of registers per thread */
FLOPS* ← 0                            /* FLOPS*: maximum floating point operations per second */
mrc* ← -1                             /* mrc*: optimal mrc (maximum register count) */
for mrc = 0 to maxregs do             /* mrc: maximum register count a GPU kernel can use */
    f_mrc ← compile_kernel(f, mrc)    /* compile kernel f s.t. at most mrc registers are used */
    if f_mrc ≠ nil then
        FLOPS ← speed_test(f_mrc)     /* launch the compiled kernel, get its speed in FLOPS */
        if FLOPS > FLOPS* then        /* better than the best FLOPS observed so far? */
            FLOPS* ← FLOPS            /* update FLOPS*, the incumbent speed record */
            mrc* ← mrc                /* mark mrc* as the best mrc found so far */
        end if
    end if
end for
if FLOPS* > 0 then
    return f_mrc*                     /* return the MRC-optimized kernel f_mrc* */
end if
return nil                            /* return failure otherwise */
```

Pseudocode of maximum register count optimization

FIG. 5

TABLE 3

| b | 2×2 | 3×3 | 4×4 | 5×5 | 6×6 | 7×7 | 8×8 | 9×9 | 10×10 | 11×11 | 12×12 |
|---|-----|-----|-----|-----|-----|-----|-----|-----|-------|-------|-------|
|   |     |     |     |     | $\delta_x \times \delta_y$ | | | | | | |
| 8 | 585 | 720 | 872 | 844 | 938 | 710 | 277 | 85.2 | <u>57.3</u> | <u>44.7</u> | 39.5 |
| 12 | 594 | 749 | 864 | 869 | 917 | 744 | 277 | <u>92.5</u> | 54.2 | 44.7 | <u>40.0</u> |
| 16 | <u>613</u> | <u>779</u> | <u>897</u> | <u>941</u> | <u>979</u> | 790 | <u>281</u> | 75.5 | 53.6 | 44.5 | 25.7 |
| 20 | 563 | 736 | 837 | 853 | 903 | 805 | 262 | 74.8 | 43.1 | 30.1 | 25.9 |
| 24 | 581 | 759 | 861 | 889 | 923 | <u>858</u> | 211 | 73.7 | 42.3 | 29.9 | 25.9 |
| 32 | 606 | 779 | 854 | 924 | 726 | 687 | 174 | 76.8 | 38.9 | 29.7 | 24.6 |

Performance of MRC-optimized GEMM kernels in
GFLOPS for $M = N = K = 4096$ on GTX 580

FIG. 7

TABLE 4

| b | 2×2 | 3×3 | 4×4 | 5×5 | 6×6 | 7×7 | 8×8 | 9×9 | 10×10 | 11×11 | 12×12 |
|---|-----|-----|-----|-----|-----|-----|-----|-----|-------|-------|-------|
|   |     |     |     |     | $\delta_x \times \delta_y$ | | | | | | |
| 8 | 446 | 668 | <u>907</u> | 964 | 1130 | 1179 | <u>1265</u> | 1142 | 1271 | 959 | 1010 |
| 12 | 466 | 633 | 840 | 1004 | 1111 | 1062 | 1058 | 1168 | 1117 | 897 | 889 |
| 16 | <u>472</u> | 650 | 879 | <u>1054</u> | <u>1164</u> | 1221 | 1156 | 1196 | <u>1351</u> | <u>1043</u> | <u>1021</u> |
| 20 | 443 | <u>682</u> | 767 | 980 | 1019 | 1192 | 1038 | 1213 | 947 | 1039 | 663 |
| 24 | 450 | 677 | 745 | 1011 | 1014 | <u>1246</u> | 846 | 1009 | 1005 | 816 | 495 |
| 32 | 448 | 673 | 755 | 1033 | 857 | 1033 | 984 | 1118 | 546 | 560 | 453 |

Performance of MRC-optimized GEMM kernels
in GFLOPS for $M = N = K = 4096$ on K20c

FIG. 8

TABLE 5

| b | \multicolumn{10}{c}{$\delta_x \times \delta_y$} |
|---|------|------|------|------|------|------|------|------|------|------|------|
|   | 2×2 | 3×3 | 4×4 | 5×5 | 6×6 | 7×7 | 8×8 | 9×9 | 10×10 | 11×11 | 12×12 |
| 8 | 34 | 37 | 45 | 58 | 77 | 85 | 110 | 145 | 195 | 193 | 255 |
| 12 | 37 | 38 | 49 | 62 | 79 | 94 | 117 | 146 | 178 | 200 | 255 |
| 16 | 39 | 38 | 49 | 66 | 80 | 110 | 142 | 140 | 163 | 178 | 255 |
| 20 | 37 | 38 | 48 | 63 | 81 | 97 | 118 | 153 | 184 | 213 | 255 |
| 24 | 37 | 37 | 47 | 59 | 80 | 93 | 118 | 147 | 168 | 212 | 255 |
| 32 | 37 | 38 | 50 | 73 | 90 | 105 | 135 | 138 | 170 | 250 | 255 |

Number of registers used by regular GEMM
kernels compiled for CUDA compute capability 3.5

FIG. 9

TABLE 6

| b | \multicolumn{10}{c}{$\delta_x \times \delta_y$} |
|---|------|------|------|------|------|------|------|------|------|------|------|
|   | 2×2 | 3×3 | 4×4 | 5×5 | 6×6 | 7×7 | 8×8 | 9×9 | 10×10 | 11×11 | 12×12 |
| 8 | 38 | 38 | 48 | 71 | 130 | 117 | 101 | 113 | 128 | 209 | 228 |
| 12 | 46 | 38 | 49 | 72 | 88 | 72 | 91 | 112 | 128 | 247 | 197 |
| 16 | 40 | 64 | 48 | 70 | 89 | 128 | 85 | 120 | 127 | 227 | 238 |
| 20 | 61 | 48 | 54 | 72 | 77 | 112 | 91 | 121 | 214 | 248 | 211 |
| 24 | 39 | 48 | 53 | 70 | 93 | 128 | 160 | 201 | 220 | 250 | 200 |
| 32 | 49 | 54 | 54 | 96 | 94 | 116 | 162 | 204 | 236 | 246 | 164 |

Number of registers used by MRC-optimized GEMM kernels
compiled for CUDA compute capability 3.5

FIG. 10

Speedup of MRC-optimized GEMM kernels
for $\delta_x$ ($=\delta_y$) $\in$ [2, 12] on K20c Speed of MRC-optimized GEMM kernels
in GFLOPS for $\delta_x$ ($=\delta_y$) $\in$ [4, 12] on K20c Optimal block size $b$ of MRC-optimized GEMM kernels for $\delta_x$ (=$\delta_y$) ∈ [2, 12] on K20c

SYSTEM AND METHOD FOR GPU MAXIMUM REGISTER COUNT OPTIMIZATION APPLIED TO GENERAL MATRIX-MATRIX MULTIPLICATION

RELATED APPLICATION

The present disclosure is related to U.S. patent application Ser. No. 15/190,073, titled "System And Method For Speeding Up General Matrix-Vector Multiplication On GPU," by inventor Rong Zhou, filed 22 Jun. 2016, the disclosure of which is hereby incorporated by reference herein.

The present disclosure is related to U.S. patent application Ser. No. 15/169,422, titled "System And Method For Speeding Up General Matrix-Matrix Multiplication On The GPU," by inventor Rong Zhou, filed 31 May 2016, the disclosure of which is hereby incorporated by reference herein.

The present disclosure is related to U.S. patent application Ser. No. 14/580,110, titled "Computer-Implemented System And Method For Efficient Sparse Matrix Representation And Processing," by inventor Rong Zhou, filed 22 December 2014, the disclosure of which is hereby incorporated by reference herein.

The present disclosure is related to U.S. patent application Ser. No. 14/275,347, titled "System And Method For High Performance K-Means Clustering On GPU With Smart Kernels," by inventor Rong Zhou, filed 12 May 2014, the disclosure of which is hereby incorporated by reference herein.

BACKGROUND

Field

The present disclosure generally relates to general matrix-matrix multiplication (GEMM) on a graphics processing unit (GPU). More specifically, the present disclosure relates to a method and system for GPU maximum register count (MRC) optimization applied to GEMM.

Related Art

Graphics processing units (GPUs) offer cost-effective high-performance computing solutions that are attractive for computation-intensive applications, especially those with real-time constraints. Compute Unified Device Architecture (CUDA) is a parallel computing platform and programming model created by NVIDIA for general-purpose GPU computing. At the center of CUDA's tool chain is nvcc, a LLVM-based C/C++ compiler that generates code which runs on both the CPU and GPU.

For the part of code that runs on the GPU, nvcc allows a user-specified command-line option ("-maxrregcount") to control the maximum number of registers that a GPU function, called a kernel, may use. Different GPU architectures can have different hardware limits on how many registers a kernel may use. For CUDA compute capability 1.0~1.3, the limit is 128 registers; for compute capability 2.x and 3.0, it is 63 registers; for 3.5 and 5.0, it is 255 registers. The default setting, which corresponds to the command-line option "-maxrregcount 0", lets nvcc figure out the best allocation of registers on its own, while respecting all the hardware limits.

Although the default setting relieves the programmer from having to specify the ceiling of register usage, it can also produce sub-optimal code that leaves room for improvement.

SUMMARY

One embodiment of the present invention provides a method for performing a general matrix-matrix multiplication (GEMM) operation using a kernel compiled with optimal MRC. During operation, the system may generate the kernel compiled with optimal MRC, which involves determining a fastest compiled kernel among a set of compiled kernels by comparing the speeds of the compiled kernels. Each kernel is compiled with a different MRC value between zero and a predetermined maximum number of registers per thread. The fastest compiled kernel is determined to be the kernel with optimal MRC. The system may then receive data representing at least two matrices. The system may select the kernel compiled with optimal MRC, and perform the GEMM operation on the two matrices using the selected kernel.

In a variation on this embodiment, the kernel compiled with optimal MRC uses a block size b that is not a multiple of 16.

In a variation on this embodiment, the kernel compiled with optimal MRC may use a row-stop value $\delta_x$ greater than 6 or may use a column-stop value $\delta_y$ greater than 6.

In a further variation, the kernel compiled with optimal MRC is a variable-dimension GEMM kernel with the row-stop value $\delta_x$ not equal to the column-stop value $\delta_y$.

In a variation on this embodiment, the kernel compiled with optimal MRC is a variable-dimension GEMM kernel with the row-stop value $\delta_x$ not equal to the column-stop value $\delta_y$.

In a variation on this embodiment, for at least one combination of row and column parameters, the kernel compiled with optimal MRC is the fastest kernel among a set of GEMM kernels that can perform a GEMM operation for matrices with the combination of row and column parameters.

In a variation on this embodiment, the system may receive data representing a matrix and a vector, and perform a general matrix-vector multiplication (GEMV) operation on the matrix and the vector using a selected kernel compiled with optimal MRC. Note that for at least one combination of dimensional parameters, the selected kernel compiled with optimal MRC is a fastest kernel among a set of GEMV kernels that can perform a GEMV operation for matrix and vector combinations with the dimensional parameters.

In a variation on this embodiment, the system may receive data representing a sparse matrix and a vector. The system may perform sparse matrix-vector multiplication (SpMV) on a GPU by performing operations that include applying a selected kernel compiled with optimal MRC to at least one portion associated with at least one partition. Note that a portion includes a row of the matrix, and a respective plurality of portions are associated with a respective partition.

In a further variation, the system may use a selected kernel compiled with optimal MRC to perform k-means clustering as an assignment kernel or as an update kernel, wherein the kernel achieves the best performance among all k-means GPU assignment kernels or k-means GPU update kernels tested for at least one combination of test dimensions and test numbers of clusters.

BRIEF DESCRIPTION OF THE FIGURES

FIG. 3 presents Table 1 which shows the performance of GEMM kernels in GFLOPS for M=N=K=4096 on GTX 580.

FIG. 4 presents Table 2 which shows the performance of GEMM kernels in GFLOPS for M=N=K=4096 on K20c.

FIG. 5 presents the pseudocode of MRC optimization, in accordance with an embodiment of the present invention.

FIG. 7 presents Table 3 which shows the performance of MRC-optimized GEMM kernels in GFLOPS for M=N=K=4096 on GTX 580.

FIG. 8 presents Table 4 which shows the performance of MRC-optimized GEMM kernels in GFLOPS for M=N=K=4096 on K20c.

FIG. 9 presents Table 5 which shows the number of registers used by regular GEMM kernels compiled for CUDA compute capability 3.5.

FIG. 10 presents Table 6 which shows the number of registers used by MRC-optimized GEMM kernels compiled for CUDA compute capability 3.5.

In the figures, like reference numerals refer to the same figure elements.

DETAILED DESCRIPTION

Figure 1:
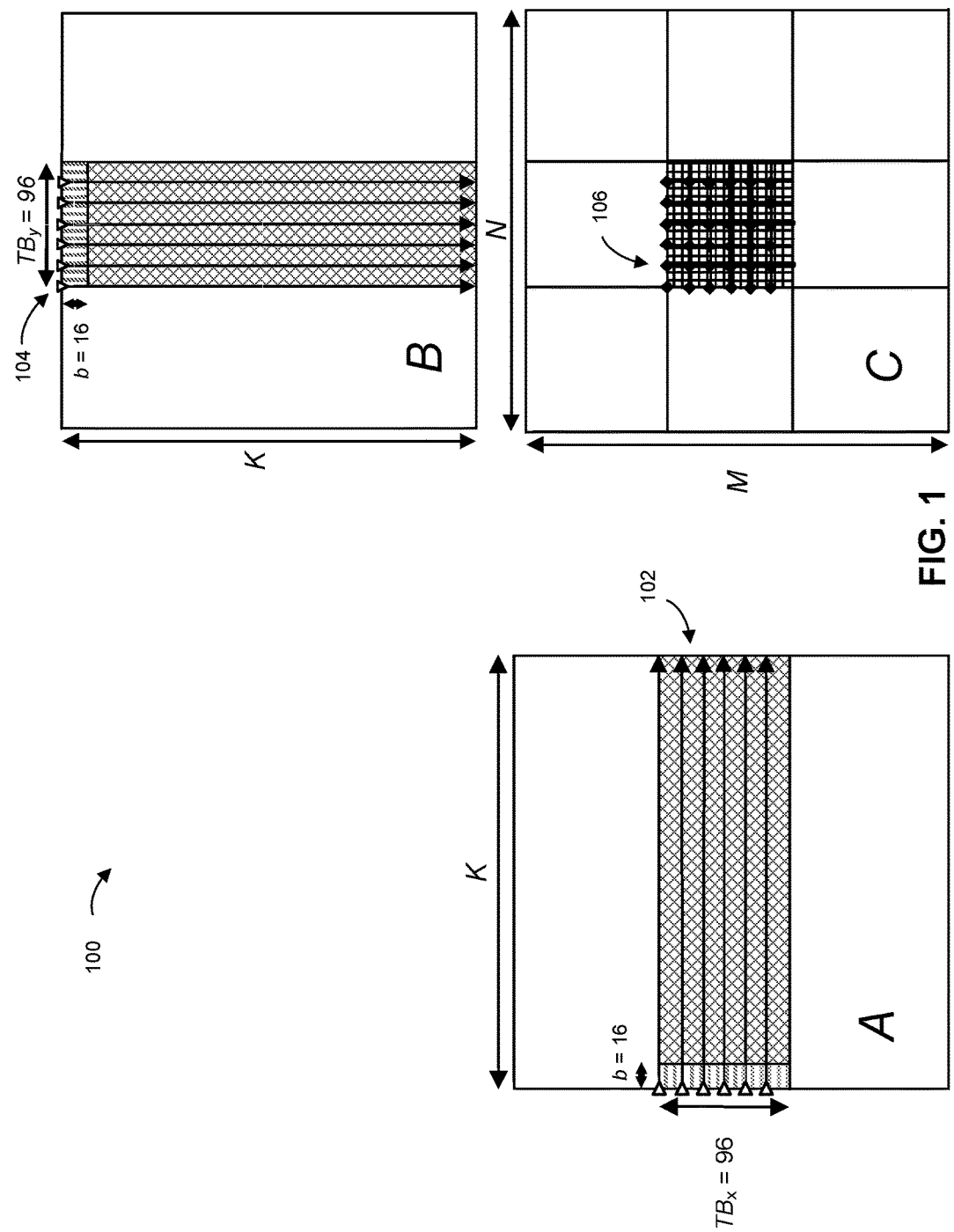
FIG. 1 presents a diagram illustrating rows of matrix A and columns of matrix B processed by a thread block to compute a sub-matrix of C, according to one approach for performing GEMM.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention solve the problem of improving performance of GEMM operations by introducing techniques for generating a kernel with optimal MRC for performing GEMM operations.

This disclosure describes a general approach to optimizing the performance of GPU kernels by systematically searching in the space of the maximum number of registers made available to a single thread at compile time. The disclosure below uses GEMM as an example to demonstrate the benefit of this approach. Experiments show that the number of registers used can have a significant impact on the performance of GEMM, and that the default compiler setting, which imposes the least constraint on the maximum number of registers used, rarely produces the most optimized code. As a result, previous state-of-the-art GEMM implementations such as Matrix Algebra on GPU and Multicore Architectures (MAGMA) may not achieve the best performance on newer hardware such as NVIDIA's Kepler GPU that has more registers than its predecessors. However, with MRC optimization, the speed of GEMM can be further improved. More importantly, this disclosure identifies additional code optimization opportunities that have been largely overlooked in the past.

A system for determining optimal MRC for performing GEMM operations may initially generate kernels with different maximum register counts and test the speed of the kernels to select the fastest kernel for performing GEMM operations. The system may compile a number of kernels, with each kernel using a different MRC between zero and the maximum number of registers per thread. The system may iteratively test the speed of each compiled kernel, and determine which compiled kernel is the fastest among all the compiled kernels.

The system need only perform the experiments once to generate a kernel with optimal MRC, and the optimal MRC does not vary with time. Also, no source code changes are required to improve performance.

Although the examples provided herein describe using a kernel with optimal MRC to perform GEMM operations, embodiments of the present invention can also include using a kernel with optimal MRC to perform other operations, such as GEMV operations, SpMV operations, and k-means clustering.

General Matrix-Matrix Multiplication

Instead of always using a default setting for the maximum number of registers that a kernel may use, this disclosure describes a systematic approach that tests different register usage ceilings to determine an optimal number of registers for a kernel. To show the performance gain of this technique, this disclosure uses GEMM as an example, since it is well studied in the HPC community and has a number of high-performance GPU-based implementations.

GEMM is a key linear-algebra operation commonly used in math programming software such as LINPACK, MATLAB, and R. It is a level 3 basic linear algebra subprogram (BLAS), a de facto standard API for linear algebra libraries and routines. Mathematically, GEMM does the following computation:

$$C = \alpha AB + \beta C$$

where matrices A, B, C are M×K, K×N, M×N respectively, and $\alpha$, $\beta$ are scalars.

The computation complexity of GEMM is O(MNK), which increases quickly with the sizes of these matrices. The high computational intensity of GEMM makes it ideal for the GPU. For dense linear algebra operations such as GEMM, the GPU enjoys a significant speed advantage over the CPU.

MAGMA and Computing a Sub-Matrix

FIG. 1 presents a diagram 100 illustrating rows of matrix A 102 and columns of matrix B 104 processed by a thread block to compute a sub-matrix of C 106, according to one approach for performing GEMM. MAGMA is a state-of-the-art dense linear algebra library that offers highly optimized GEMM routines specifically tuned for the latest GPUs including NVIDIA's Fermi and lately the Kepler GPUs. MAGMA divides up the computation of the resulting matrix C into sub-matrices, each of which is processed by a 16×16 thread block (TB). Each TB is responsible for processing $TB_x$ rows of matrix A and $TB_y$ columns of matrix B, as illustrated by the two areas with crosshatching in FIG. 1. To compute a sub-matrix of C, a TB uses ⌈K/b⌉ iterations, each responsible for multiplying $TB_x$ rows and b columns of A with b rows and $TB_y$ columns of B, where b is the block size typically set to be the maximum number of contiguous memory accesses that can be combined into a single "coalesced" memory transaction. For NVIDIA GPUs, b is 16, half of the size of a warp, which is a group of 32 threads in a single streaming multiprocessor (SM) of the GPU. The optimal $TB_x$ and $TB_y$ depend on many factors of the GPU, including the maximum number of registers per thread, the size of shared memory on each SM, and the number of threads in a TB. For Fermi and Kepler GPUs, MAGMA uses $TB_x=TB_y=96$ as its GEMM parameters, which tend to optimize performance for large matrices. That is, a single TB computes a 96×96 sub-matrix of C, writing a total of 96×96=9,216 elements. Because the size of a TB is 16×16, each of the 256 threads is responsible for computing 9,216/256=36 elements of the sub-matrix of C, with stride 16.

FIG. 1 illustrates such an arrangement where thread (0, 0), the first of the 256 threads, is responsible for multiplying 6 rows of A marked by ▷ with 6 columns of B marked by ▽. As a result, thread (0, 0) computes 6×6=36 elements of C, as marked by ♦ in FIG. 1. With stride 16, it can be shown that multiple writes to the resulting matrix C are combined into fewer coalesced memory transactions, which are important for high-throughput GEMM.

Recently, the concept of variable-dimension GEMM kernels has been proposed in U.S. patent application Ser. No. 15/169,422, entitled "System And Method For Speeding Up General Matrix-Matrix Multiplication On The GPU," by inventor Rong Zhou, filed 31 May 2016. The basic idea is to use a parameterized set of $TB_x$'s and $Tb_y$'s to implement the GEMM kernels, such as $TB_x=16\delta_x$ and $TB_y=16\delta_y$, where $\delta_x$ and $\delta_y$ are positive integers $\in[1, \delta_{max}]$. $\delta_x$ and $\delta_y$ are referred to as row-stops and column-stops, respectively. The reason for having $\delta_x$ and $\delta_y$ as adjustable GEMM parameters is that their product $\delta_x\delta_y$ determines the number of C elements computed by a single thread, which needs to keep track of $\delta_x\delta_y$ running sums, one for each element of C assigned to the thread. For maximum performance, it is best to store these running sums in on-chip registers. However, the maximum number of registers in a Fermi GPU for a single thread is only 63, since all Fermi GPUs are of compute capability 2.x, which constrains the practical values of $\delta_x$ and $\delta_y$, because if $\delta_x\delta_y>63$, there will not be enough registers for a Fermi GPU to hold all the elements of C in registers, causing some of the running sums to be stored in private local memory, which is significantly slower than L1 cache or shared memory. This is called register spilling, which should be carefully avoided in most cases.

GEMM with Variable-Dimension Kernels

Figure 2:
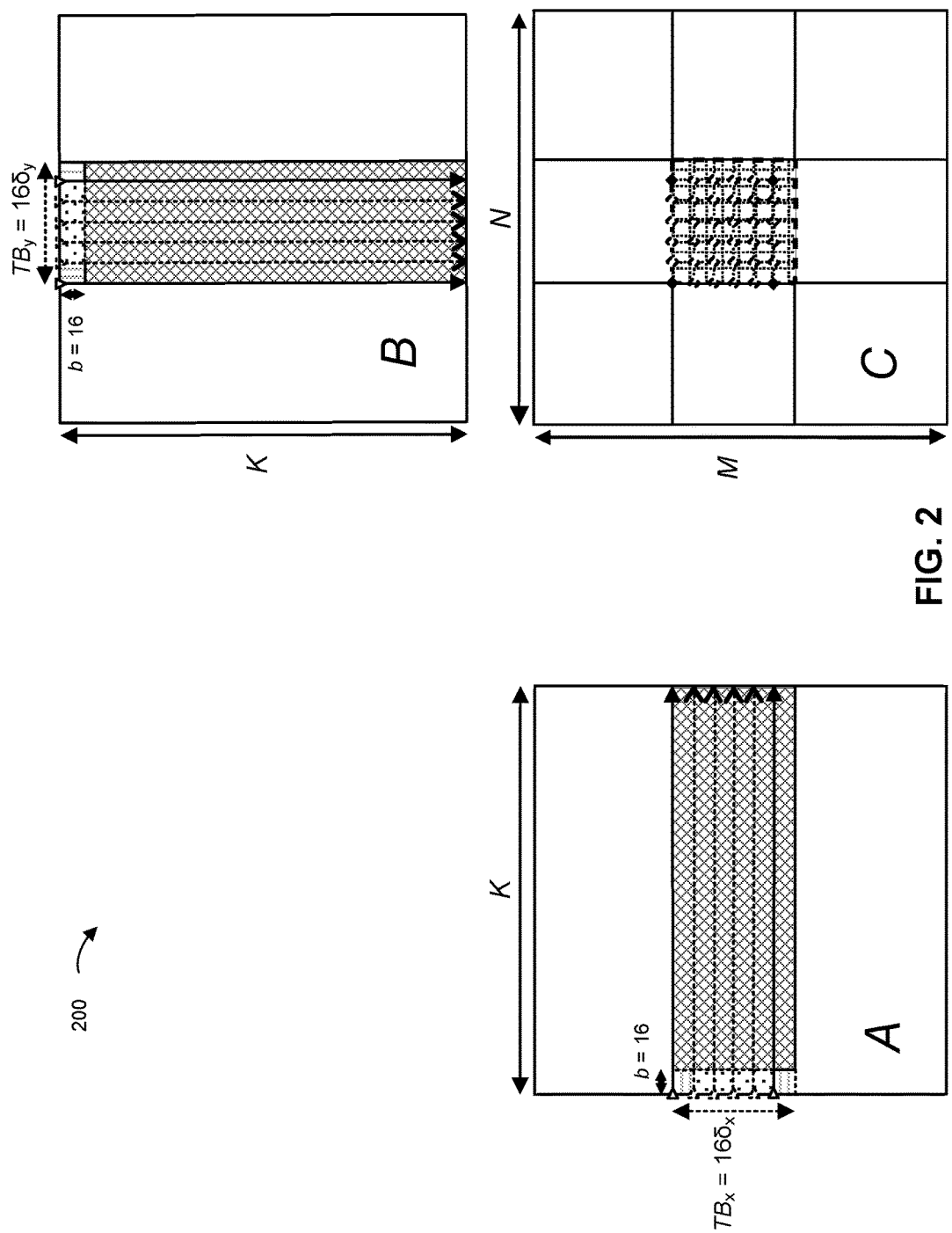
FIG. 2 presents a diagram illustrating GEMM with variable-dimension kernels, in accordance with an embodiment of the present invention.

FIG. 2 presents a diagram illustrating GEMM with variable-dimension kernels, in accordance with an embodiment of the present invention. As shown in FIG. 2, the variable-dimension kernels are flexible in their row-wise and column-wise dimensions measured by $TB_x$ and $TB_y$, making it possible to compute as few as one or as many as $(\delta_{max})^2$ elements of C in a single thread. The latest Kepler GPU allows a single thread to use up to 255 registers, which roughly equals $(\delta_{max})^2$ for $\delta_{max}=16$. Note that MAGMA's GEMM implementation can be seen as a special case of the variable-dimension GEMM kernels with $\delta_x=\delta_y=6$. To allow better code optimization, one can declare $\delta_x$ and $\delta_y$ as constants that are determined at compile time. Thus, instead of having one kernel that handles all possible row- and column-stops $\delta_x$, $\delta_y\in[1, \delta_{max}]$, one can have a $\delta_{max}\times\delta_{max}$ array of kernels such that each implements a specific combination of $\delta_x$ and $\delta_y$.

Both FIG. 1 and FIG. 2 use 16 as the default value of b. It is possible to use other values such as 8 or 12, and this disclosure explores the performance implication of using such unconventional values. This disclosure examines these alternatives closely to get a more comprehensive picture of the design space for GPU-based GEMM.

Determining Design Parameters

To maximize memory throughput, GEMM kernels usually load portions of matrices A and B into shared memory, which is much faster than global memory, before multiplying them on the GPU. For each TB, the amount of shared memory required is $O((TB_x+TB_y)b)$. Since the maximum size of shared memory is fixed on each SM, using a smaller (or larger) b means having larger (or smaller) $TB_x$ and $Tb_y$, and vice versa. This results in an interesting design tradeoff:

Small b's: Trade memory coalescence off for large $TB_x$ and $TB_y$, which lead to fewer TBs Large b's: Trade fewer TBs (i.e., large $TB_x$ and $TB_y$) off for better memory coalescence That is, there are two forces at work here: memory coalescence and the number of TBs, which are often at odds. It seems unclear which force has a greater influence on the GEMM performance, and thus experiments are the only way to find out the overall winner.

FIG. 3 presents Table 1 which shows the performance of GEMM kernels in GFLOPS for M=N=K=4096 on GTX 580. FIG. 4 presents Table 2 which shows the performance of GEMM kernels in GFLOPS for M=N=K=4096 on K20c. To determine the best design parameters for GEMM kernels, experiments were run on GeForce GTX 580 (Fermi) and K20c (Kepler) GPUs, and the results are presented in Tables 1 and 2. The numbers in Tables 1 and 2 are formatted such that (1) the maximum GFLOPS of each row is in bold font and (2) the maximum GFLOPS of each column is underlined. For example, the cell "950" in Table 1 is bold because it shows the maximum GFLOPS for the row "b=16". The same cell is also underlined because it has the maximum GFLOPS for column "$\delta_x\times\delta_y=6\times6$".

While the numbers of Tables 1 and 2 are different, the same design parameters b=16 and $\delta_x\times\delta_y=6\times6$ were responsible for producing the maximum GEMM performance of 950 GFLOPS on GTX580 and 1191 GFLOPS on K20c in these two tables. This is the reason why MAGMA's GEMM implementation remains the same between Fermi and Kepler, since it appears in the tables that the same parameters can achieve the "best" GEMM results for both GPU architectures. However, if one considers the number of registers used in the GEMM kernels as an additional design parameter, better performance can emerge from regions of the design space previously considered to be inferior.

FIG. 5 shows the pseudocode of MRC optimization. The technique searches systematically in the space of all possible maximum register counts (e.g., by using different maxrregcount values in nvcc's −maxrregcount compiler option), performs speed tests on the generated kernel executables, and selects the kernel with the highest speed. For nvcc, the default maxrregcount value is 0, which relies entirely on the compiler to come up with the best register allocation strategy. The default setting can be viewed as a special case of MRC optimization, which tests for the full range of possible maxrregcount values besides 0. In other words, the performance of a kernel after MRC optimization shall never become worse than before, since the default setting is also included as part of the optimization technique.

Exemplary Process to Perform GEMM Operation Using Kernel with Optimal MRC

Figure 6:
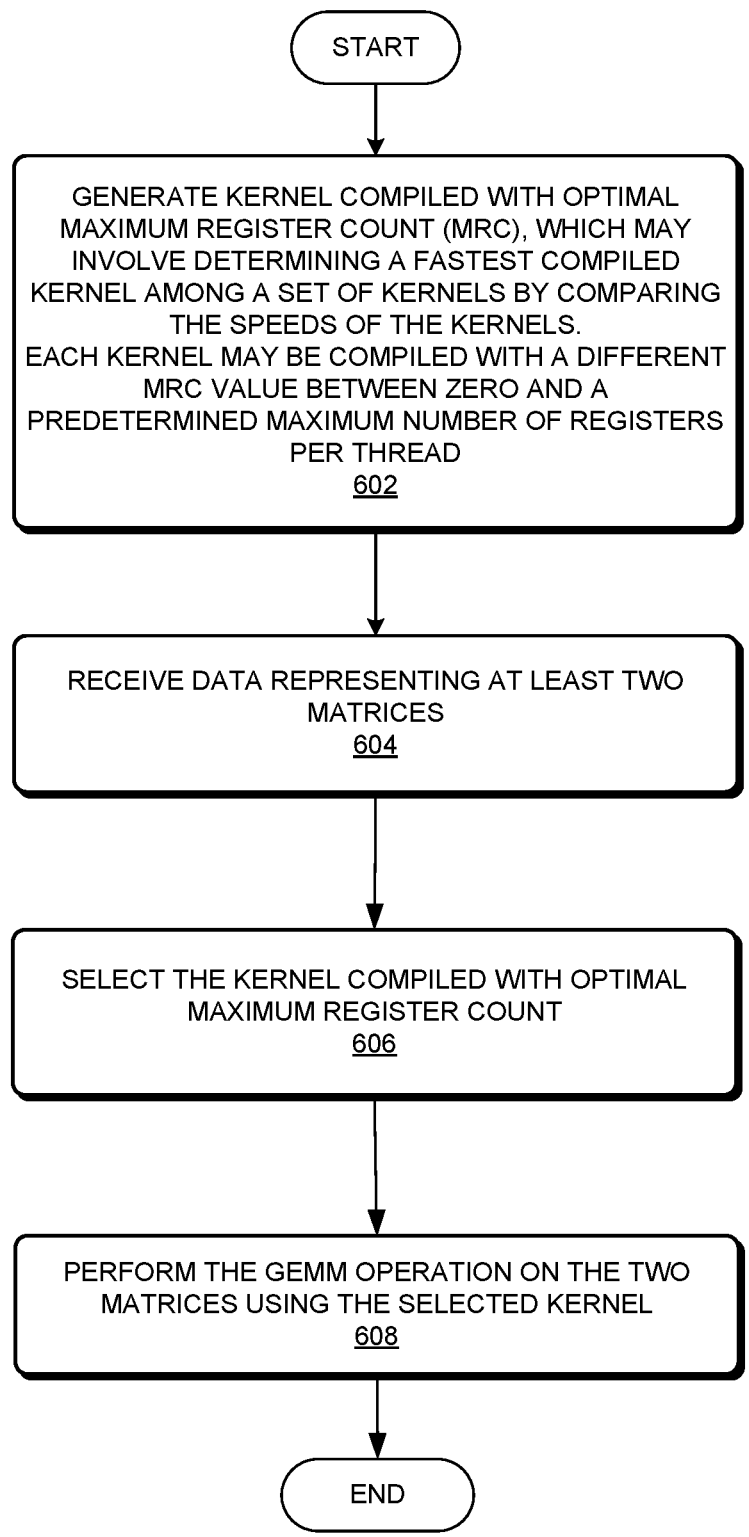
FIG. 6 presents a flow chart illustrating an exemplary process for performing a GEMM operation with MRC optimization, in accordance with an embodiment of the present invention.

FIG. 6 presents a flow chart illustrating an exemplary process for performing a GEMM operation using a kernel compiled with optimal MRC, in accordance with an embodiment of the present invention. As depicted in FIG. 6, the system may initially generate the kernel compiled with optimal MRC, which may involve determining a fastest compiled kernel among a set of kernels by comparing the speeds of the kernels (operation 602). The system may compile each kernel with a different MRC value between zero and a predetermined maximum number of registers per thread. The system may determine that the fastest compiled kernel is the kernel with optimal MRC.

The system may receive data representing at least two matrices (operation 604). The system may select the kernel compiled with optimal MRC (operation 606). The system may then perform the GEMM operation on the two matrices using the selected kernel (operation 608).

The system may use a kernel with optimal MRC to perform a GEMM operation. In some embodiments, the system may access a rules collection stored in a database to determine a mapping from the dimensions of the input matrices to a specific kernel. The kernel that the system selects according to the rules is the best (e.g., fastest) kernel for the particular dimensions of the input matrices. The kernel is called an a kernel (or smart kernel) because, for at least one combination of row and column parameters, the kernel is the fastest kernel among a set of GEMM kernels that can perform a GEMM operation for matrices with the combination of row and column parameters. The system may then perform a GEMM operation using the selected best kernel. This kernel may be compiled with optimal MRC.

The system may use a selected kernel with optimal MRC to perform a GEMV operation. In some embodiments, the system may access a rules collection stored in a database to determine a mapping from the dimensions of an input matrix and vector to a specific kernel. The kernel that the system selects according to the rules is the best (e.g., fastest) kernel for the particular dimensions of the input matrix and vector. This α kernel (or smart kernel) is, for at least one combination of dimensional parameters, the fastest kernel among a set of general matrix-vector multiplication (GEMV) kernels that can perform a GEMV operation for matrix and vector combinations with the dimensional parameters. The system may then perform a GEMV operation using the selected best kernel. This kernel may be compiled with optimal MRC.

The system may use a selected kernel with optimal MRC to perform sparse matrix-vector multiplication (SpMV) on a GPU. Sparse matrices are matrices in which a majority of elements are zero.

The system may obtain a compressed representation of a sparse matrix including one or more non-zero entries. The system may index portions of the matrix based on their position in the matrix. The portions may include one of rows and columns of the matrix. The system may define a plurality of partitions for the portions of the matrix. The system may obtain a number of the non-zero entries in each of the portions using the compressed representation. Each of the portions is associated with one of the partitions based on a number of the non-zero entries in that portion. The system may create listings of all the portions associated with each of the partitions, with the portions listed in order of their indexes. The system may then create a partitioned compressed representation of the matrix that includes a mapping array that includes the listings. The system may select one of a plurality of kernel functions for processing the portions associated with each of the partitions.

In some embodiments, the system may perform a sparse matrix vector multiplication operation using a selected kernel with optimal MRC, with a portion being a row. In some embodiments, the system may perform a sparse matrix vector transpose multiplication operation using a kernel with optimal MRC, with a portion being a column.

The system may use a selected kernel with optimal MRC to perform k-means clustering. k-means clustering has many applications, including data mining. It is an iterative technique in which a single iteration has two phases: 1. Assignment phase: Each data point is assigned to one of the k clusters that is the closest in terms of the Euclidean distance between the point and the centroid of the cluster. 2. Update phase: Update all k cluster centroids by computing the arithmetic mean of each cluster.

In some embodiments, the system may use a selected kernel with optimal MRC to perform k-means clustering as an assignment kernel or as an update kernel. The kernel may be an a kernel that achieves the best performance among all k-means GPU assignment or k-means GPU update kernels tested for at least one combination of test dimensions and test numbers of clusters.

Performance Testing Results

To assess the benefit of MRC optimization, experiments were conducted on the resulting GEMM kernels, which are henceforth referred to as MRC-optimized kernels. Recall that an MRC-optimized kernel should at least be as fast as a regular kernel. However, to better demonstrate the speed difference, a special version of MRC optimization was used in the experiments that does not include the default compiler setting (−maxrregcount 0), even though it should be according to FIG. 5. Doing so ensures the MRC-optimized kernel executables cannot be obtained by simply turning on the default compiler settings. Note that for kernel executables that use the same number of registers, the mapping between variables and registers is not necessarily the same. Furthermore, the compiler may choose to use fewer registers in a kernel than what would be allowed by the maxrregcount value. For example, if two kernels both use 62 registers, their executables can be very different, if one is compiled with the default setting and the other is compiled with a maxrregcount of 63, which would be still different from the one compiled with a maxrregcount of 62.

FIG. 7 presents Table 3 which shows the performance of MRC-optimized GEMM kernels in GFLOPS for M=N=K=4096 on GTX 580. FIG. 8 presents Table 4 which shows the performance of MRC-optimized GEMM kernels in GFLOPS for M=N=K=4096 on K20c. Although it is widely believed that the default compiler setting usually does a good job of mapping variables to registers (and therefore no need for explicit MRC optimization), the experimental results show that this is not the case, at least for GEMM. Tables 3 and 4 show the performance of the MRC-optimized GEMM kernels for the same square matrices M=N=K=4096 on GTX580 and K20c. It can be observed that in most cases, the MRC-optimized kernels outperform the regular ones generated from the default setting. The improvements are more significant for K20c, which is a Kepler GPU capable of using as many as 255 registers in a single thread, compared to only 63 on a Fermi GPU.

With MRC optimization, the best GEMM kernel is different for different GPU architectures: for GTX580 (Fermi), it is $\delta_x \times \delta_y$=6×6 and b=16; whereas for K20c (Kepler), it is $\delta_x \times \delta_y$=10×10 and b=16.

Figure 11:
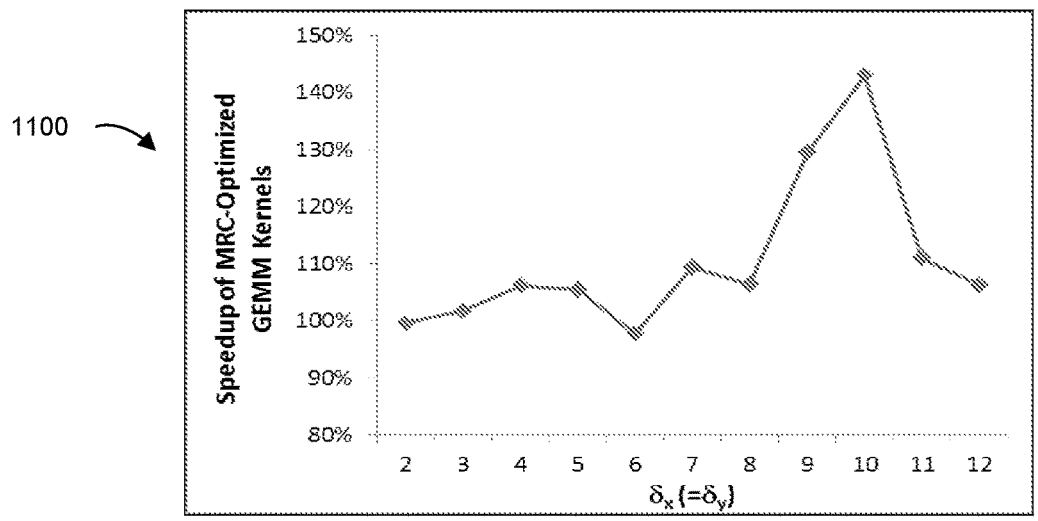
FIG. 11 presents a chart showing the percentage of relative speedup for various MRC-optimized GEMM kernels on K20c compared against the same kernels that do not receive MRC optimization.

FIG. 9 presents Table 5 which shows the number of registers used by regular GEMM kernels compiled for CUDA compute capability 3.5. FIG. 10 presents Table 6 which shows the number of registers used by MRC-optimized GEMM kernels compiled for CUDA compute capability 3.5. As shown in the tables, the number of registers used by these kernels can be quite different, even if they correspond to the same CUDA implementation. Furthermore, there is no simple way to predict the "optimal" number of registers based on how many registers are used in the default compiler setting. For small $\delta_x$ and $\delta_y$, MRC-optimized kernels tend to use more registers than does the regular ones. However, it tends to be the other way around for large $\delta_x$ and $\delta_y$, such as 12×12. But there are exceptions. For example, the regular 10×10 kernel with b=8 uses 67 more registers than the MRC-optimized version (195 vs. 128); whereas the 10×10 kernel with b=32 uses 66 fewer registers than the MRC-optimized one (170 vs. 236) on K20c. The systematic testing approach of FIG. 11 is motivated by these variations and exceptions that are difficult to model mathematically or even heuristically. As long as the maximum number of registers a GPU thread can use is relatively small (e.g., 255), systematic testing should be feasible. This is true now, as well as in the foreseeable future.

It is worth pointing out that the actual number of registers used, such as those shown in Tables 5 and 6, may not be the same as the maxrregcount value used to generate the kernel executables, although in most cases they are indeed the same. What is guaranteed by nvcc is that it will not use more than maxrregcount number of registers but it is OK to use fewer. In other words, two kernel executables generated from the same source code and using exactly the same number of registers may not be identical, if different values of maxrregcount were used to produce the binaries.

FIG. 11 presents a chart showing the percentage of relative speedup for various MRC-optimized GEMM kernels on K20c, compared against the same kernels that do not receive any MRC optimization. That is, it shows the benefit realized by changing the maxrregcount value supplied to the nvcc compiler and the source code remains exactly the same. The peak of the improvement is achieved at $\delta_x = \delta_y = 10$, which corresponds to the "$\delta_x \times \delta_y$=10×10" columns in Tables 5 and 6. By reducing the number of registers used from 163 to 127, the GEMM speed of the 10×10 kernel with b=16 is improved from 945 to 1351 GFLOPS, which is 143% relative speedup (the peak shown in FIG. 11).

If one only paid attention to Table 2, the "best" GEMM kernel would have been the 6×6 kernel with b=16, overlooking the 10×10 kernel which has a better performance in Table 4. Thus, MRC optimization not only improves the speed of individual kernels, it also changes what would be considered as the "best" kernel.

Figure 12:
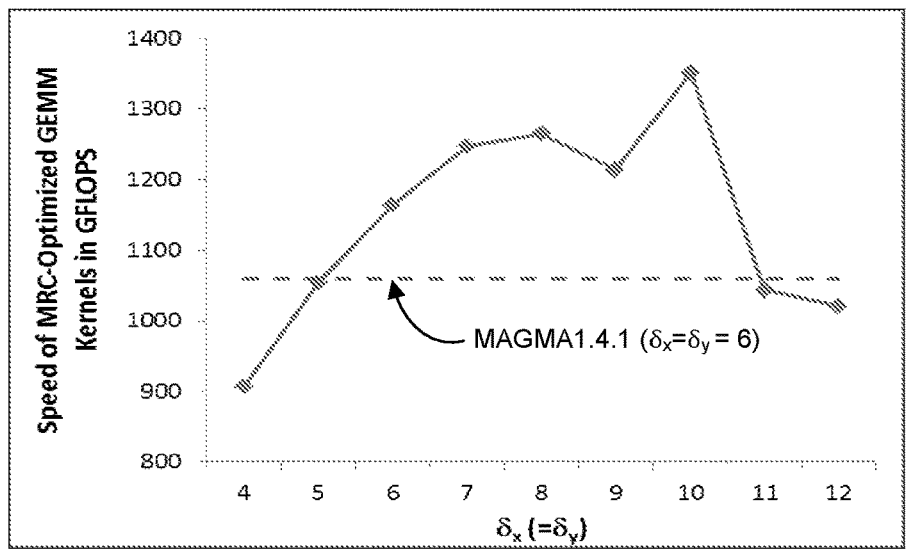
FIG. 12 presents a chart showing the GFLOPS speed of different MRC-optimized GEMM kernels on K20c.

FIG. 12 presents a chart showing the GFLOPS speed of different MRC-optimized GEMM kernels on K20c. The dash line marks the GEMM speed of MAGMA1.4.1, which uses $\delta_x = \delta_y = 6$ and b=16 as its implementation parameters. The best MRC-optimized kernel, which is the 10×10 kernel with b=16, achieves 127% the speed of MAGMA.

Figure 13:
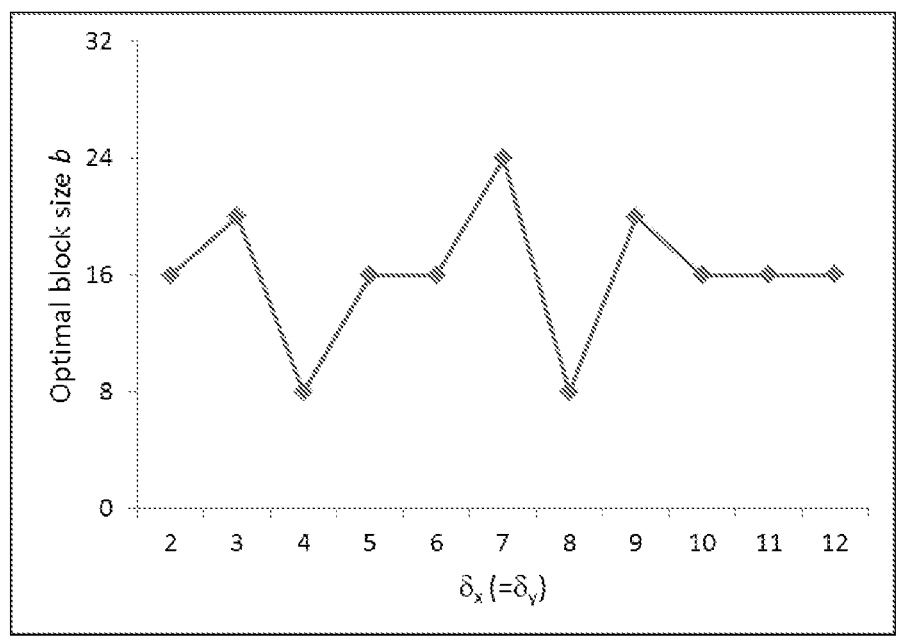
FIG. 13 presents a chart showing the optimal block size b as a function of $\delta_x$ (and $\delta_y$) for MRC-optimized kernels on K20c.

FIG. 13 presents a chart showing the optimal block size b as a function of $\delta_x$ (and $\delta_y$) for MRC-optimized kernels on K20c. The default block size b=16 is the best for about half of the cases (6 out of 11). For the remaining cases, b=8 is the best for $\delta_x = \delta_y = \{4, 8\}$, b=20 best for $\delta_x = \delta_y = \{3, 9\}$, and b=24 best for $\delta_x = \delta_y = 7$. Although the fastest kernel still uses b=16, the second and third fastest kernels use b=8 and b=24, respectively. As new GPU architectures emerge in the future, these unconventional block sizes may challenge the current champion b=16.

This disclosure is the first to show that kernels with unconventional block sizes can approach those with a canonical block size in terms of GEMM performance. In fact, of the five MRC-optimized kernels that outperform MAGMA, three (i.e., 60%) use a block size other than 16. This can be particularly useful for GEMM operations involving tall-and-skinny matrices, because $TB_y = 16\delta_y \le N+15$ and, for small N's, the maximum $\delta_y$ can be rather limited. For example, if N≤144, then $\delta_y \le 9$ and thus the "$\delta_x \times \delta_y$=10×10" kernel would waste some shared memory and become less efficient.

Figure 14:
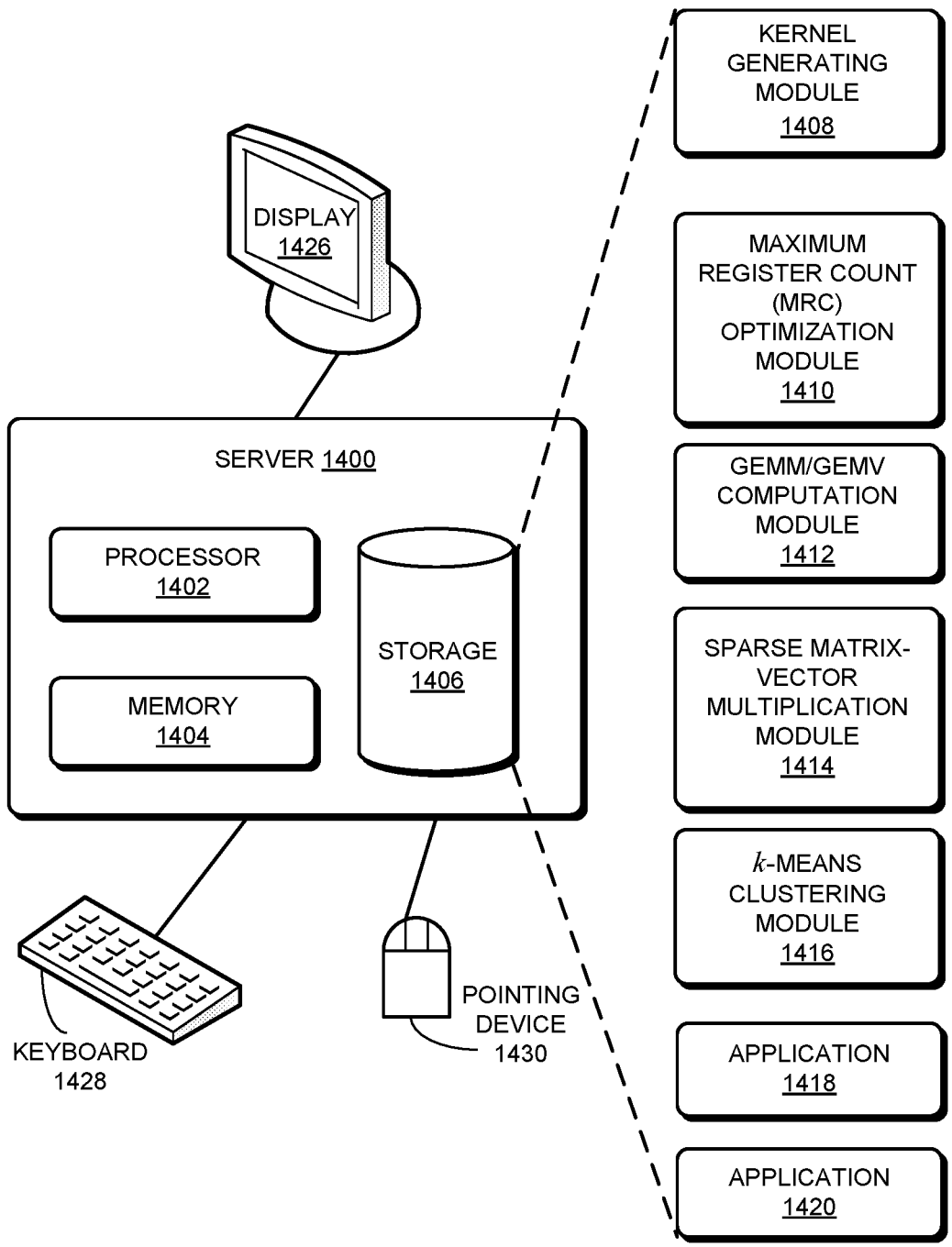
FIG. 14 presents an exemplary server for performing GEMM operations with MRC optimization, in accordance with an embodiment of the present invention, in accordance with an embodiment of the present invention.

FIG. 14 presents an exemplary server 1400 for performing GEMM operations with MRC optimization, in accordance with an embodiment of the present invention. In FIG. 14, server 1400 includes a processor 1402, a memory 1404, and a storage device 1406. Storage device 1406 stores programs to be executed by processor 1402. Specifically, storage device 1406 stores a kernel generating module 1408, a MRC optimization module 1410, a GEMM/GEMV computation module 1412, a sparse matrix-vector multiplication module 1414, and a k-means clustering module 1416, as well as other applications, such as applications 1418 and 1420.

Kernel generating module 1408 may generate MRC-optimized GEMM kernels, including variable-dimension GEMM kernels such as constant-K GEMM kernels, variable-K GEMM kernels, or any combination thereof.

In some embodiments, kernel generating module 1408 may also generate different varieties of MRC-optimized GEMV kernels, such as a MRC-optimized variable-rows GEMV kernel, a MRC-optimized variable-threads GEMV kernel, and a MRC-optimized 1B1R variable-thread GEMV kernel. Kernel generating model 1408 may generate yet other varieties of MRC-optimized kernels for performing GEMV operations.

Variable-rows GEMV kernels allow for flexibility in the number of rows of the matrix used by a thread block in computing a sub-vector. The system may select the best variable-rows GEMV kernel for performing computations according to the particular parameter combination of the matrix and vector being multiplied.

Variable-threads GEMV kernels allow for controlling the size of a thread block. One can specify the number of threads of a thread block as a multiple of a thread-factor value. 1B1R variable-thread GEMV kernels employ an entire thread block to process a single row of a matrix.

MRC optimization module 1410 may determine the optimal MRC for kernels. In some implementations, module 1410 may be integrated into kernel generating module 1408.

GEMM/GEMV computation module 1412 may select the fastest MRC-optimized kernel according to kernel selection rules for performing a GEMM/GEMV operation. The rules may map particular dimensions of the matrices (or matrix and vector) to specific kernels that are the fastest for those dimensions. The module may perform the GEMM/GEMV operation on the input matrices (or matrix and vector). Sparse matrix-vector multiplication module 1414 may perform a sparse matrix-vector multiplication operation using a MRC-optimized kernel. k-means clustering module 1416 may perform k-means clustering using MRC-optimized kernels.

During operation, kernel generating module 1408, MRC optimization module 1410, GEMM/GEMV computation module 1412, sparse matrix-vector multiplication module 1414, and k-means clustering module 1416 are loaded from storage device 1406 into memory 1404 and then executed by processor 1402. While executing the program, processor 1402 performs the aforementioned functions. Server 1400 may be coupled to an optional display 1426, a keyboard 1428 and a pointing device 1430.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for performing a general matrix-matrix multiplication (GEMM) operation on a graphics processing unit (GPU), comprising:
   generating, by a computer, a plurality of kernels, wherein a respective kernel of the plurality of kernels is a function compiled for execution on the GPU, and wherein a respective kernel of the plurality of kernels is compiled with a respective maximum register count (MRC) value between zero and a predetermined number representing a maximum number of registers per thread, and wherein a thread performs operations associated with the kernel;
   maintaining a set of rules, wherein a respective rule includes a mapping between dimensional parameters of respective input matrices of the GEMM operation and a corresponding kernel, wherein the mapping indicates that the corresponding kernel can perform the GEMM operation faster than any other kernel in the plurality of kernels for the dimensional parameters in the mapping based on the MRC value of the corresponding kernel;
   storing data associated with two matrices in a memory device of the computer based on a row-major order or a column-major order with at least one row or column having no adjacent storage padding, wherein an adjacent storage padding is a set of bits for aligning a start address of the row or column, thereby reducing memory usage on the computer;
   determining a first set of dimensional parameters of the two matrices;
   loading a kernel from the plurality of kernels on the GPU for performing the GEMM operation on the GPU by looking up the first set of dimensional parameters in the set of rules; and
   executing the loaded kernel on the GPU using the two matrices stored in the memory device as parameters, thereby performing the GEMM operation on the two matrices.

2. The method of claim 1, wherein the loaded kernel is associated with a block size that is not a multiple of 16, and wherein the block size indicates a number of threads for computing a submatrix associated with the two matrices.

3. The method of claim 1, wherein the loaded kernel is associated with at least one of a row-stop value $\delta_x$ greater than 6 and a column-stop value $\delta_y$ greater than 6.

4. The method of claim 3, wherein the loaded kernel is a variable-dimension GEMM kernel with the row-stop value $\delta_x$ not equal to the column-stop value $\delta_y$.

5. The method of claim 1, further comprising maintaining a second set of rules, wherein a respective rule in the second set of rules includes a second mapping between dimensional parameters associated with respective input matrix and vector pair of a general matrix-vector multiplication (GEMV) operation and a corresponding GEMV kernel, wherein the second mapping indicates that the corresponding GEMV kernel can perform the GEMV operation faster than any other kernel among a set of GEMV kernels dimensional parameters in the second mapping based on the MRC value of the corresponding kernel.

6. The method of claim 5, further comprising:
   receiving data representing a matrix and a vector;
   determining a second set of dimensional parameters of the matrix and the vector;
   loading a kernel from the second set of kernels on the GPU for performing the GEMV operation on the GPU by looking up the second set of dimensional parameters in the plurality of rules; and
   executing the loaded kernel on the GPU using the matrix and the vector as parameters, thereby performing the GEMV operation on the matrix and the vector.

7. The method of claim 1, further comprising:
   receiving data representing a sparse matrix and a vector; and
   performing sparse matrix-vector multiplication (SpMV) on the GPU by performing operations that include applying a kernel compiled with an optimal MRC to at least one portion associated with at least one partition of the sparse matrix, wherein the portion includes a row of the sparse matrix, and wherein a respective portion is associated with a corresponding partition of the sparse matrix.

8. The method of claim 1, further comprising:
using a kernel compiled with an optimal MRC to perform k-means clustering as an assignment kernel or as an update kernel, wherein the selected kernel compiled with the optimal MRC achieves the best performance among all k-means GPU assignment kernels or k-means GPU update kernels tested for at least one combination of test dimensions and test numbers of clusters.

9. The method of claim 1, wherein of the GEMM operation is associated with at least one of: a machine learning operation, a data mining operation, and a graphics operation.

10. A non-transitory computer-readable storage medium storing instructions which when executed by a computer cause the computer to perform a method for general matrix-matrix multiplication (GEMM) on a graphics processing unit (GPU), the method comprising:
generating, by a computer, a plurality of kernels, wherein a respective kernel of the plurality of kernels is a function compiled for execution on the GPU, and wherein a respective kernel of the plurality of kernels is compiled with a respective maximum register count (MRC) value between zero and a predetermined number representing a maximum number of registers per thread, and wherein a thread performs operations associated with the kernel;
maintaining a set of rules, wherein a respective rule includes a mapping between dimensional parameters of respective input matrices of the GEMM operation and a corresponding kernel, wherein the mapping indicates that the corresponding kernel can perform the GEMM operation faster than any other kernel in the plurality of kernels for the dimensional parameters in the mapping based on the MRC value of the corresponding kernel;
storing data associated with two matrices in a memory device of the computer based on at a row major order or a column-major order with at least one row or column having no adjacent storage padding, wherein an adjacent storage padding is a set of bits for aligning a start address of the row or column, thereby reducing memory usage on the computer;
determining a first set of dimensional parameters of the two matrices;
loading a kernel from the plurality of kernels on the GPU for performing the GEMM operation on the GPU by looking up the first set of dimensional parameters in the set of rules; and
executing the loaded kernel on the GPU using the two matrices stored in the memory device as parameters, thereby performing the GEMM operation on the two matrices.

11. The non-transitory storage medium of claim 10, wherein the loaded kernel is associated with a block size that is not a multiple of 16, wherein the block size indicates a number of threads for computing a submatrix associated with the two matrices.

12. The non-transitory storage medium of claim 10, wherein the loaded kernel is associated with at least one of a row-stop value $\delta_x$ greater than 6 and a column-stop value $\delta_y$ greater than 6.

13. The non-transitory storage medium of claim 10, wherein the loaded kernel is a variable-dimension GEMM kernel with the row-stop value $\delta_x$ not equal to the column-stop value $\delta_y$.

14. The non-transitory storage medium of claim 10, wherein the method further comprises maintaining a second set of rules, wherein a respective rule in the second set of rules includes a second mapping between dimensional parameters associated with respective input matrix and vector pair of a general matrix-vector multiplication (GEMV) operation and a corresponding GEMV kernel, wherein the second mapping indicates that the corresponding GEMV can perform the GEMV operation faster than any other kernel among a set of GEMV for the dimensional parameters in the second mapping based on the MRC value of the corresponding kernel.

15. The non-transitory storage medium of claim 14, wherein the method further comprises:
receiving data representing a matrix and a vector;
determining a second set of dimensional parameters of the matrix and the vector;
loading a kernel from the second set of kernels on the GPU for performing the GEMV operation on the GPU by looking up the second set of dimensional parameters in the plurality of rules; and
executing the loaded kernel on the GPU using the matrix and the vector as parameters, thereby performing the GEMV operation on the matrix and the vector.

16. A computing system comprising:
one or more processors;
a graphics processing unit (GPU);
a memory device; and
a non-transitory computer-readable medium coupled to the one or more processors storing instructions stored that, when executed by the one or more processors, cause the computing system to perform a method for performing a general matrix-matrix multiplication (GEMM) operation on the GPU, the method comprising:
generating, by a computer, a plurality of kernels, wherein a respective kernel of the plurality of kernels is a function compiled for execution on the GPU, and wherein a respective kernel of the plurality of kernels is compiled with a respective maximum register count (MRC) value between zero and a predetermined number representing a maximum number of registers per thread, and wherein a thread performs operations associated with the kernel;
maintaining a set of rules, wherein a respective rule includes a mapping between dimensional parameters of respective input matrices of the GEMM operation and a corresponding kernel, wherein the mapping indicates that the corresponding kernel can perform the GEMM operation faster than any other kernel in the plurality of kernels for the dimensional parameters in the mapping based on the MRC value of the corresponding kernel;
storing data associated with two matrices in the memory device based on a row-major order or a column-major order with at least one row or column having no adjacent storage padding, wherein an adjacent storage padding is a set of bits for aligning a start address of the row or column, thereby reducing memory usage on the computer;
determining a first set of dimensional parameters of the two matrices;
loading a kernel from the plurality of kernels on the GPU for performing the GEMM operation on the GPU by looking up the first set of dimensional parameters in the set of rules; and
executing the loaded kernel on the GPU using the two matrices stored in the memory device as parameters, thereby performing the GEMM operation on the two matrices.

17. The computing system of claim 16, wherein the loaded kernel is associated with at least one of a row-stop value $\delta_x$ greater than 6 and a column-stop value $\delta_y$ greater than 6.

18. The computing system of claim 16, wherein the loaded kernel is a variable-dimension GEMM kernel with the row-stop value $\delta_x$ not equal to the column-stop value $\delta_y$.

19. The computing system of claim 16, wherein the method further comprises:
   receiving data representing a sparse matrix and a vector; and
   performing sparse matrix-vector multiplication (SpMV) on the GPU by performing operations that include applying a kernel compiled with an optimal MRC to at least one portion associated with at least one partition of the sparse matrix, wherein the portion includes a row of the sparse matrix, and wherein a respective portion is associated with a corresponding partition of the sparse matrix.

20. The computing system of claim 16, wherein the method further comprises:
   using a kernel compiled with an optimal MRC to perform k-means clustering as an assignment kernel or as an update kernel, wherein the selected kernel compiled with the optimal MRC achieves the best performance among all k-means GPU assignment kernels or k-means GPU update kernels tested for at least one combination of test dimensions and test numbers of clusters.

\* \* \* \* \*